US008010524B2

(12) United States Patent
Chen et al.

(10) Patent No.: US 8,010,524 B2
(45) Date of Patent: Aug. 30, 2011

(54) METHOD OF MONITORING ELECTRONIC MEDIA

(75) Inventors: Ying Chen, San Jose, CA (US); Amit Behal, San Jose, CA (US); Thomas D. Griffin, Campbell, CA (US); Larry L. Proctor, Coppell, TX (US); W. Scott Spangler, San Martin, CA (US)

(73) Assignee: International Business Machines Corporation, Armonk, NY (US)

( * ) Notice: Subject to any disclaimer, the term of this patent is extended or adjusted under 35 U.S.C. 154(b) by 734 days.

(21) Appl. No.: 11/927,238

(22) Filed: Oct. 29, 2007

(65) Prior Publication Data
US 2009/0119275 A1 May 7, 2009

(51) Int. Cl.
*G06F 17/30* (2006.01)
(52) U.S. Cl. .......................... 707/722; 707/769
(58) Field of Classification Search .................. None
See application file for complete search history.

(56) References Cited

U.S. PATENT DOCUMENTS

| | | | |
|---|---|---|---|
| 6,658,423 B1 * | 12/2003 | Pugh et al. ..................... | 707/102 |
| 7,003,511 B1 | 2/2006 | Antonov | |
| 2002/0049704 A1 | 4/2002 | Vanderveldt et al. | |
| 2006/0041530 A1 * | 2/2006 | Milic-Frayling et al. ......... | 707/2 |
| 2006/0041550 A1 * | 2/2006 | Bennett et al. .................... | 707/5 |
| 2006/0190333 A1 * | 8/2006 | Choi .............................. | 705/14 |
| 2007/0043761 A1 | 2/2007 | Chim et al. | |
| 2007/0198530 A1 | 8/2007 | Takahashi et al. | |
| 2008/0005071 A1 * | 1/2008 | Flake et al. ........................ | 707/3 |
| 2009/0083251 A1 * | 3/2009 | Sahasrabudhe et al. .......... | 707/5 |

OTHER PUBLICATIONS

Kumaran, Giridhar, and James Allan. "Using Names and Topics for New Event Detection." HLT/EMNLP. (2005): 121-28.*
Paşca, Marius. "Acquisition of Categorized Named Entities for Web Search." CIKM'04. (2004): 137-45.*
Spangler et al. "COBRA—Mining Web for Corporate Brand and Reputation Analysis." 2007 IEEE.*
W. S. Spangler et al., "Machines in the conversation: Detecting themes and trends in informal communication streams", IBM Systems Journal, 2006, pp. 785-799, vol. 45, No. 4, USA.
S. Spangler et al., "Generating and Browsing Multiple Taxonomies Over a Document Collection", Journal of Management Information Systems, 2003, pp. 191-212, vol. 19, No. 4, USA.
E. Rich et al., Artificial Intelligence (Second Edition), 1991, pp. 433-444, McGraw-Hill Inc., USA.

(Continued)

*Primary Examiner* — Mohammad Ali
*Assistant Examiner* — Syed H. Hasan
(74) *Attorney, Agent, or Firm* — Daniels E. Johnson

(57) ABSTRACT

Consumer-generated media (CGM) and/or other media are monitored to allow an organization to become aware of, and respond to, issues that may affect how it is perceived by the public. An extract, transform, load (ETL) engine is used to process CGM and other media content, and an analytical engine utilizes a multi-step progressive filtering approach to identify those documents that are most relevant. The filtering approach includes executing broad queries to extract relevant content from different CGM and other sources, extracting text snippets from the relevant content and performing de-duplication, defining organizational identity (e.g., brand name, trade name, or company name) and hot-topic models using a rule-based and statistical-based approach, and using the models together in an orthogonal filtering approach to effectively generate alerts and reports. The methodology is found to be substantially more effective compared to a conventional keyword based approach.

12 Claims, 7 Drawing Sheets

OTHER PUBLICATIONS

Berkan et al., "Fuzzy Logic and Hybrid Approaches to Web Intelligence Gathering and Information Management", Proceedings of the 2002 IEEE International Conference on Fuzzy Systems, May 2002, pp. 1033-1038, vol. 2, USA.

Yi et al., "Sentiment Mining in WebFountain", Proceedings of the 21st International Conference on Data Engineering, Apr. 2005, pp. 1073-1083, USA.

* cited by examiner

| | Include Patterns | Exclude Patterns |
|---|---|---|
| All Sources | | NASA \| spacecraft \| orbiter \| wars galaxy \| search the galaxy \| search galaxy \| capital city |
| Call Center | GALAXY | |
| News | Galaxy | |
| Blogs | galaxy bar \| galaxybar \| galaxy.{0,20} chocolate \| galaxy.{0,20} candy | |
| Web | galaxy bar \| galaxybar \| galaxy.{0,20} chocolate \| galaxy.{0,20} candy | |

FIG. 4

| Include Patterns | Exclude Patterns |
|---|---|
| environment I sustainable I sustainability I conservation I climate | competitive environment I long term sustainable growth I retail |

All Sources

FIG. 5

| Data Source | Snippets | Duplicates | Alert Count | Documents (% of snippets) |
|---|---|---|---|---|
| Lexis | 7,987 | 62% | 54 | 242 (3.0%) |
| Blogs | 113,871 | 64% | 104 | 3092 (2.3%) |
| Web | 15,543 | 80% | 30 | 72 (0.4%) |

FIG. 6

METHOD OF MONITORING ELECTRONIC MEDIA

TECHNICAL FIELD

The invention relates to a method of monitoring electronic material (such as that posted on the Internet) directed to a topic that might be of concern to a particular organization. More particularly, the invention relates to the ability of an organization to effectively monitor how such a topic may affect how that organization is perceived by the public.

BACKGROUND

Organizations, such as corporations and non-profit entities, are sensitive to anything that might affect their public image, such as brand stewardship and product reputation. With the emergence of the World Wide Web, Consumer-generated Media (CGM), such as blogs, news forums, message boards, and webpages/sites, are becoming the "voice of the people". To the extent that opinion is currently monitored on the Web, a keyword-based search approach is typically used to generate a single query relating to, for example, a corporate name and/or brand. However, such an approach can return thousands of "hits" every day, thereby rendering the approach burdensome and thus ineffective to users. An improved method that monitors CGM and other media content would be desirable.

SUMMARY OF THE INVENTION

Robust methods are described herein that generate "alerts" to an organization whenever an issue arises that affects that organization's image, brands, or products. Documents associated with the alerts are more precise and relevant than those of any prior art method. As a result, an organization is able to respond to negative information (e.g., such as that posted on the Web) before its reputation is significantly damaged.

A preferred implementation of the invention includes the following steps:

i) Execute keyword-based queries against a text index of documents in a repository. These queries represent the broad area(s) of interest to an organization.

ii) For the documents that match the keyword queries, create snippets of text surrounding terms of interest, while removing any duplicate snippets.

iii) Apply to the snippets a set of models or patterns directed to one or more names (e.g., that capture an organization's identity), so that snippets that are relevant are retained for further consideration, while those that are irrelevant are excluded.

iv) Apply to those snippets retained by the previous step a set of orthogonal models or patterns directed to topics or "hot issues" of interest to the organization, so that snippets that are relevant are included, while those that are irrelevant are excluded.

Preferred methods include techniques for fast and continuous ETL (extract, transform, and load) processing of large amounts of semi-structured and unstructured data. This is advantageous since blogs and Web content tend to be dirty, noisy, and fragmented. For example, Web pages may contain banners and advertisements that need to be stripped out, and blogs may contain fragmented sentences, misspellings, and incorrect grammar. Furthermore, the Web and blogs may have many duplicates. Without special ETL processing, applying analytics may not yield meaningful results.

Unlike traditional text mining or data mining solutions that focus on specific analytics techniques, such as smart information retrieval (see, for example, D. Grossman and O. Frieder, *Information retrieval: Algorithms and heuristics*, $2^{nd}$ Edition, Springer, 2006), Natural Language Processing (NLP) to extract semantic entities out of text (also called "annotation"; see, for example, T. Gotz and O. Suhre, "Design and implementation of the UIMA common analysis system", *IBM System Journal* Vol. 43, No. 3, 2004), clustering, classification, taxonomy generation (see, for example, D. Modha and S. Spangler, "Feature weighting in K-Means clustering", *Machine learning*, Vol. 52, No. 3, pp. 217-237, 2003) and On-Line Analytical Processing (OLAP) (see, for example, R. J. Bayardo and R. Agrawal, "Mining the most interesting rules", In *Proc. Of the $5^{th}$ CAN SIGKDD Int'l Conf on Knowledge Discovery and Data Mining*, 1999), the methods described herein embed a suite of analytics capabilities to allow effective brand and reputation monitoring and alerting, which are specifically designed for the mining of blogs and other Web-based material.

In contrast to Natural Language Processing (NLP) approaches and Sentiment Annotators, the methods herein do not employ speech tagging to establish context. Instead, a "snippet" of text (e.g., the sentence(s) that actually contains the entity of interest) is used to insure context. Neither do generic dictionaries of words dictate issues of interest. These issues and their identifying regular expression patterns vary from application to application, and from data source to data source. By not using NLP techniques, but instead using regular expression patterns, domain knowledge can be captured and deployed much more readily than in prior art methods.

Preferred implementations of the invention are based in part on the insight that an alert method that relies on a single concept (such as a brand or corporate name) is unlikely by itself to generate accurate results, because such a method will either produce too many "hits" (e.g., too many articles or documents) or too many important hits will go unnoticed because relevancy ranking will fail to accurately flag them. By way of contrast, multiple, independent text pattern models (acting as filters) are described herein that capture both the organization's identity (e.g., brand name, trade name, or organization name) and an issue of immediate concern or "hot issue" surrounding that organization (which may, for example, be related to a business concern, such as product tampering or illness resulting from consuming the business' product). Using these two kinds of independent (or "orthogonal") models in concert generates results that are far more relevant than those generated by traditional keyword-based approaches.

Documents identified by the orthogonal filtering process over a specified period of time may then be brought to a user's attention by an alert accompanied by a report that includes some or all of the documents so identified. An alert may be generated whenever a document is identified as a result of the method, or for example, when the number of documents identified over a specified time period exceeds a predetermined threshold. Reports may be communicated to the user by grouping documents by organization/topic and displaying the most typical document (or most significant document) in each group first.

One preferred implementation of the invention is a computer-implemented method that includes applying at least one keyword-based query to a collection of documents (e.g., documents taken from Consumer-generated Media) to determine which ones of them are of potential interest, with the documents of potential interest forming a subset of the collection of documents. Text snippets are extracted from documents in the subset, with each of the extracted text snippets including at least one term of interest. A name-based text pattern algorithm and a topic-based text pattern algorithm are applied to text snippets extracted from documents in the subset, thereby identifying text snippets having references to both i) a particular entity of interest known by a given name and ii) a specific topic of interest. Documents corresponding to the identified text snippets are then identified. In a preferred implementation, the name-based text pattern algorithm excludes from consideration text snippets in which the given name appears but which in context does not refer to the entity of interest, and the topic-based text pattern algorithm specifies at least one unwanted text pattern that matches a topic other than the specific topic of interest, so that text snippets including said at least one unwanted text pattern are excluded from consideration. The method may be advantageously repeated on a periodic basis, and the output of the method may be provided to an interested party, who may then read at least portions of the identified documents and, in view of this reading, identify potential newsworthy trends. Each of the snippets may advantageously be no longer than three sentences, or each may be limited to 50 words, for example. The extracted text snippets are preferably examined for duplicates, which are then eliminated from any further consideration.

In other implementations, there are provided computer program products for carrying out any of the methods herein.

BRIEF DESCRIPTION OF THE DRAWINGS

FIG. 4 gives an example of an organizational identity model, which defines rule-based annotation for brands;

FIG. 5 gives an example of a topic model, which defines rule-based annotation for topics;

FIG. 6 shows results from a case study using the invention; and

DETAILED DESCRIPTION OF THE INVENTION

In preferred embodiments of the invention, a system collects data from different sources based on a scheduled time interval, and then processes and loads them into an information or data warehouse. Analytical, text pattern models are built against the warehouse and may be generated offline. The models are applied against the data in the warehouse to semantically tag, for example, brands, topics and issues. The text pattern models include an organizational identity model and a topic model, which are used together to isolate those data (e.g., documents) that are of the greatest relevance. Reports that include documents of interest may then be generated.

Various aspects of preferred implementations of the invention are now described in turn: 1) system architecture, 2) extract, transform, load (ETL) processing, 3) analytical, text pattern models, 4) effectiveness of the invention as determined from a case study, and 5) hardware that may be used to implement the methodology described herein.

1. System Architecture

Figure 1:
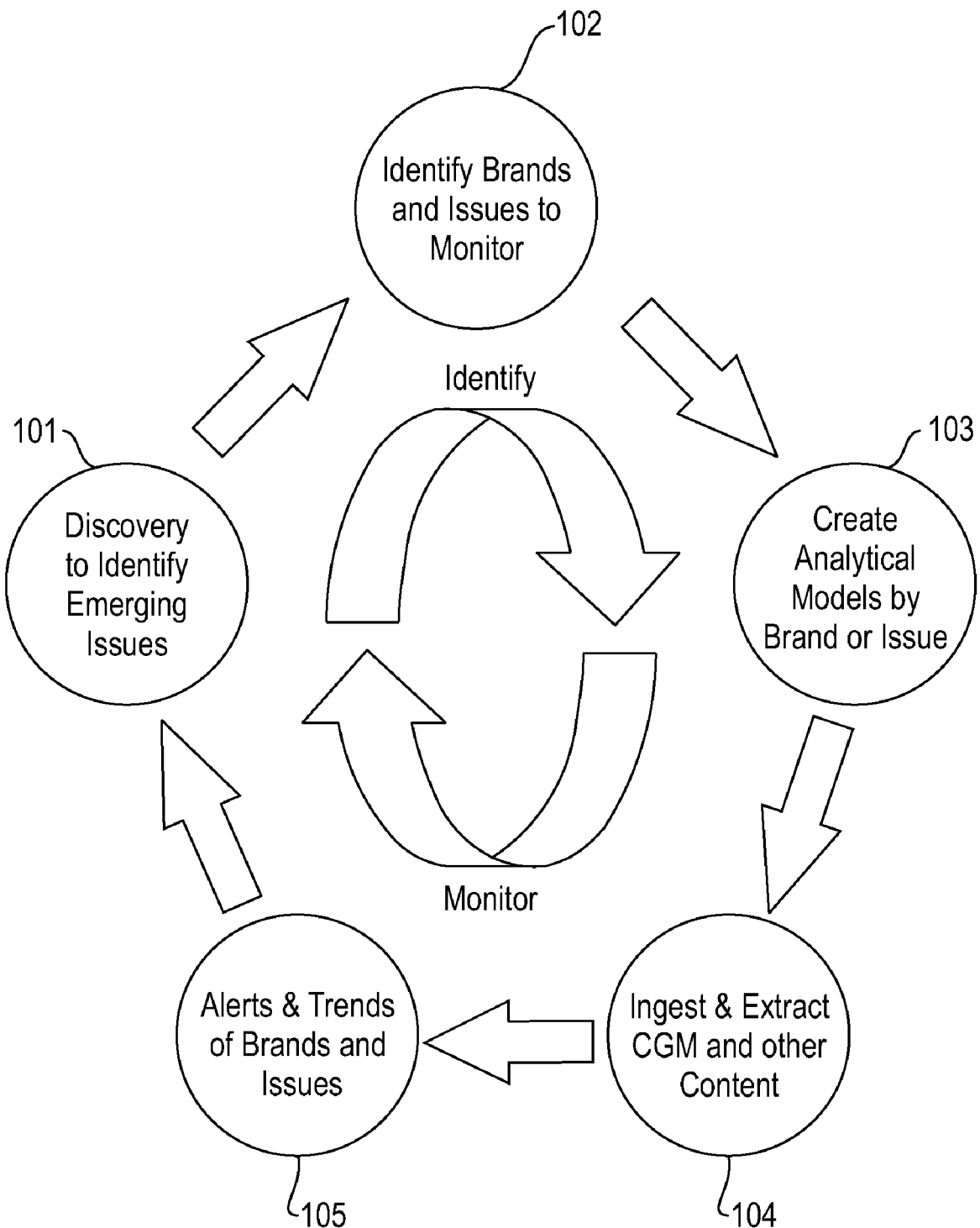
FIG. 1 illustrates an alert and monitoring process used in connection with a preferred implementation of the invention.

In a preferred method of the invention, brand image and/or reputation may be monitored using the process illustrated in FIG. 1, which includes several steps:

i) A user employs analytical tools such as the Business Insights Workbench and applies his or her own domain knowledge to discover potential brand and reputation issues (see reference numeral 101). Details regarding the Business Insights Workbench and related tools are described, for example, in U.S. Pat. No. 6,424,971 to Kreulen et al. issued Jul. 23, 2002 and titled "System and method for interactive classification and analysis of data", and in co-pending U.S. patent application Ser. No. 11/674,601 to Chen et al. filed Feb. 13, 2007 and titled "Information Mining using Domain Specific Conceptual Structures", both of which are hereby incorporated by reference.

ii) The user then identifies product categories, topics, issues and/or brands to be monitored, in view of step i) (see reference numeral 102).

iii) Next, a set of appropriate content sources are identified and analytical models (text pattern algorithms) are configured and built for the items identified in step ii) (see reference numeral 103).

iv) The content sources are configured and "ETLed" (extracted, transformed, and loaded) into a data warehouse and ingested on an ongoing basis, e.g., daily or hourly (see reference numeral 104).

v) Finally, the alert and event management is enabled, thereby permitting a user to monitor different types of alerts, e.g., strong signals, weak signals, time-driven, etc. (see reference numeral 105). A report that includes some or all of the documents identified accompanies the alert.

The above process may be advantageously implemented in an iterative fashion, since each report typically provide new insights, thereby permitting the identification of new topics/issues to be monitored and/or the refinement of existing analytical models.

Figure 2:
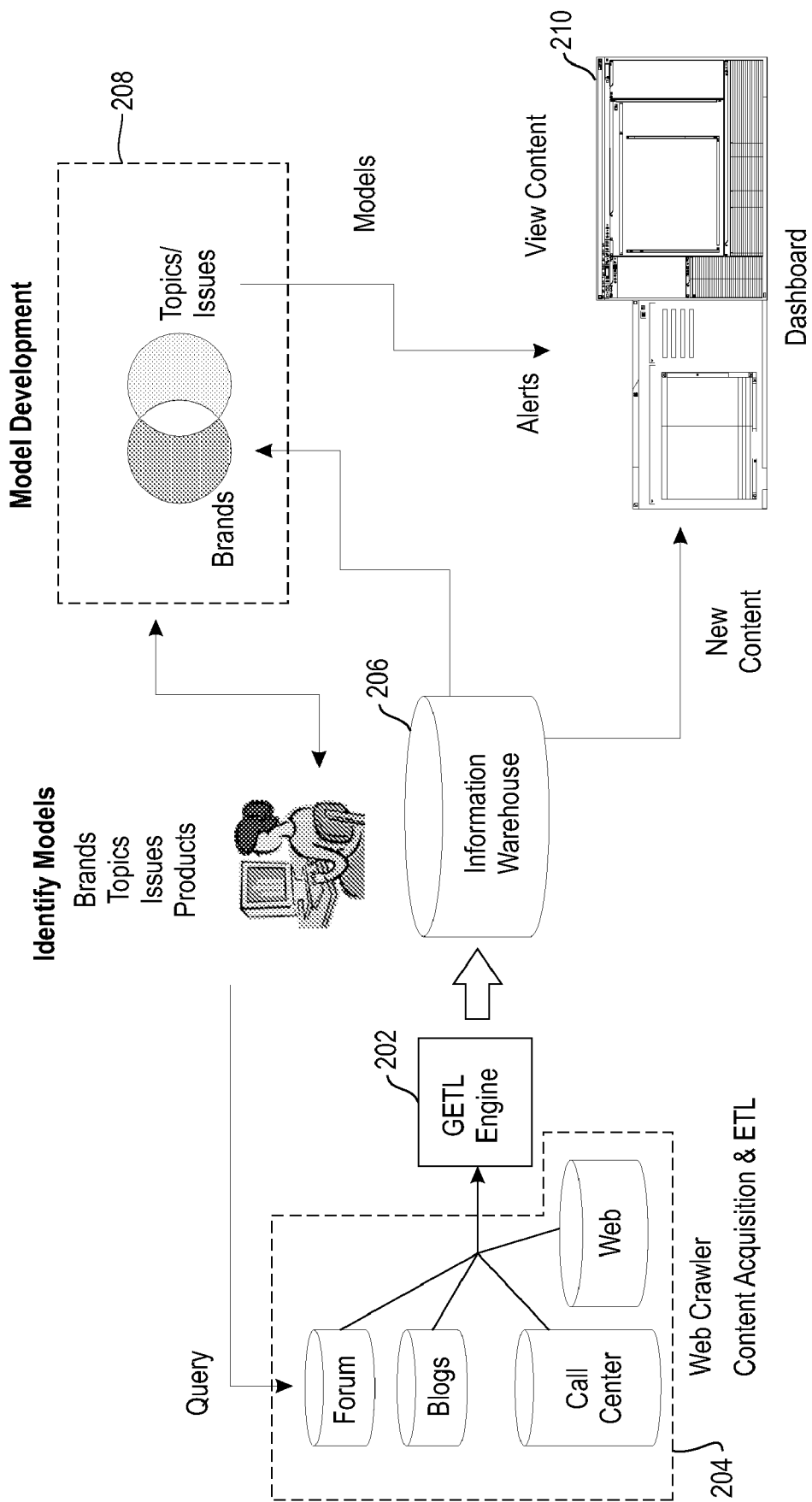
FIG. 2 illustrates preferred system architecture.

To enable the process shown in FIG. 1, the various core system components shown in FIG. 2 may be employed. A general ETL (GETL) engine 202 that continuously processes both structured and unstructured consumer-generated media (CGM) and other media contents 204 creates an information warehouse 206. Also, an analytics engine allows users to build analytical models 208 that are used to semantically tag brands, topics, and issues from different content sources. Finally, an alerting mechanism utilizes the semantically tagged data to generate brand image and reputation alerts, which may be presented to end users as a Web-based dashboard GUI 210. A report typically accompanies each alert.

Preferred implementations of the invention use at least two different types of analytical models having text pattern recognition algorithms. One type is directed to organizational identity, such as the name of an organization, one of its brand names, trade names, products, or services, or even the name of a person. Another type of model is directed to a topic or issue of interest to the organization. For example, a consumer food company interested in monitoring topics such as obesity, contamination, and health may want a topic model having a text pattern recognition algorithm for each such topic. In this manner, a topic model can be applied against brands to identify potential brand image and reputation issues, thereby allowing the brand-owner the opportunity to enhance and/or protect its brand image. Using this two-type model approach or "orthogonal filtering" technique allows accurate reports to be generated without overwhelming the user with too much information, while at the same ensuring that significant events will not be overlooked. More details regarding this orthogonal filtering technique are presented in Section 3.

In preferred methods of the invention, the models can be generated by utilizing one or more users' domain knowledge, and/or they can be automatically generated, based on text analysis. Automatically generated text pattern models can be useful when users do not have a clear view of what hot topics to initially study. Furthermore, they can enhance the user-defined models by identifying potential issues and topics of which users may not be aware.

In addition to the identity models and the topic models already discussed, additional models may be used, such as a sentiment model that detects positive and negative tones of text, thereby ascertaining whether a given topic has had a positive or a negative effect from the organization's perspective. This allows more precise alerting as well as deeper insights into the brand and reputation issues. For example, it is not uncommon for people to associate chocolate and health in both positive and negative ways.

In what follows, a consumer goods company is used as an example to illustrate the monitoring of brand and food-related issues and topics. Specifically, the company is assumed to be interested in general topics related to chocolate, as well as in issues specific to its brands of chocolate.

2. General ETL (GETL) Processing

Figure 3:
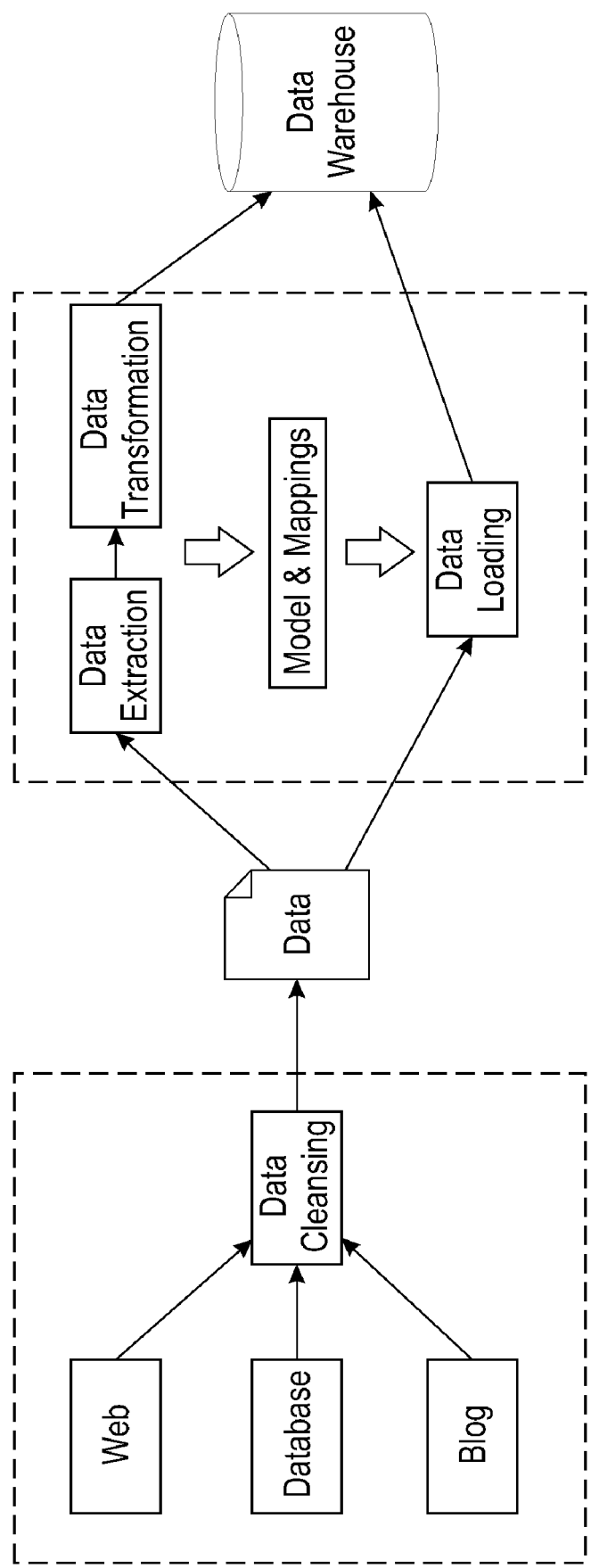
FIG. 3 illustrates preferred general extract transform load (GETL) system architecture.

Although ETL processing for structured data is a well-understood problem, ETL processing for semi-structured and unstructured data has received little attention. The advances of text mining technologies demand better ETL tools and techniques to quickly process large amounts of unstructured and semi-structured data from different content sources into an appropriate format in a data warehouse. Otherwise, the analytics may not be effective. To address this, a GETL technique was developed that utilizes a high-level language based approach to tackle problems related to unstructured ETL processing. This technique is discussed in co-pending U.S. patent application Ser. No. 11/759,851 to Chen et al. filed Jun. 7, 2007 and titled "A Business Information Warehouse Toolkit and Language for Warehousing Simplification and Automation", which is hereby incorporated by reference. Specifically, GETL contains a framework to access and extract data from different content sources as shown in FIG. 3, ranging from call center relational databases (RDBMS), blog feeds, news feeds, and Web crawls. Then, GETL utilizes data cleansing techniques to cleanse data, such as duplicate detection and elimination (for Web content).

The cleansed data may undergo a set of transformation steps through which a set of structured data may be extracted and transformed into standard formats. Blog and news feeds frequently come in XML format. The XML tags may contain structured fields, such as the URL of the blog entries, news, and the publish dates, all of which may be valuable for analysis. GETL can extract and transform this data into standard formats via a transformation framework. By way of example, different date/time formats may be transformed into a common and standard mm-dd-yy:hour-minute-second format. Users can also define their own extraction and transformation functions in GETL, including text annotators that extract semantic entities out of unstructured text (see T. Gotz, supra). Such extracted information can be loaded as structured fields as well.

GETL loads the extracted and transformed structured and text fields into a data warehouse stored in RDBMS. The warehouse can use standard schemas such as star and snowflake schemas or custom schemas to enable traditional OLAP queries. Furthermore, GETL contains an indexing framework that allows different and multiple indexing engines to be utilized. Full text indexing engine such as Lucene can be used to index text fields. An RDBMS index can be built for structured data.

In general, GETL renders all ETL operations via a high level declarative language. Hence, users only need to express what data they are interested in analyzing and utilizing, rather than how to process the data into data warehouses. Detailed GETL techniques are described in U.S. patent application Ser. No. 11/674,601 to Chen et al., supra.

3. Analytical, Text Pattern Models

Preferred embodiments of the invention apply multiple analytical models to effectively monitor issues related to a particular organization's name or brand. In general, i) broad keyword-based queries are applied to a collection of documents in order to generate ii) snippets of text to which are then applied iii) analytical models selected in such a way as to result in iv) orthogonal filtering of the snippets. An v) alert may then be generated and the relevant documents may be provided to the user. These aspects of the invention are now discussed in turn.

3.1 Broad Keyword-Based Queries

Broad queries are used to extract relevant information from selected data sources, such as the Web. For a case study involving "chocolate", one can employ a "chocolate" keyword query to pull chocolate-related data from various data sources, e.g., blog feeds, news feeds, webpages, and internal call center database entries (all of which are denoted herein generically as "documents"), similar to conventional Google® searches. If one wants to monitor specific brands or trade names, one can construct a keyword query for that trade name. Typically, for a set of brands, the query should include all the brand names and possible variations of those brand names.

Such broad queries need not be extremely precise, since subsequent analysis steps will be employed to filter the data still further. However, the queries should not be too generic, since that would result in too much irrelevant information be included in the resulting subset of documents, thereby diluting the results. For example, generic brand names, e.g., "Dove"® or "Galaxy"®, could be refined as "Dove"® within 10 words of "chocolate".

3.2. Text Snippets

Once the broad queries are run and the result set is ETLed into the data warehouse, a set of text snippets (discussed in greater detail below) is generated from the result set. Generating text snippets can be extremely helpful when analyzing Web content such as blogs, news, webpages, and long articles. Such documents are often noisy and may cover diverse topics in any one document, even though only a few sentences might be relevant to the subject of interest. For instance, an article about unhealthy foods might discuss French fries, chewing gum, sugary cereal, etc., with only a passing reference to chocolate. Using a text snippet approach helps filter out documents that would otherwise be included simply because of the coincidental co-occurrence of terms within those documents. To more precisely analyze text in the context of business objectives, text snippets extracted from the query result set are stored in the data warehouse.

A text snippet is simply a small text segment around a specified keyword. The snippet can be defined by sentence boundaries, e.g., the snippet may cover the sentence before and after the word "chocolate", as well as the sentence in which the word "chocolate" is found (i.e., a total of three sentences), or it may be defined by something else in the syntax of the document that indicates a beginning and an end (e.g., a semicolon or the beginning or end of a paragraph may be used in defining a snippet). Alternatively, the snippet may be defined by the set of words within a given number of words of the word of interest, e.g., all the words within 20 words (or 50 words) of the word "chocolate" may define the text segment that makes up the "snippet". In general, text snippets are built around organizational identity models, e.g., brand names.

To extract all the text snippets that mention specific chocolate brands of interest, e.g., "m&m's|Mars|crunch|kisses" (all of which are trademarks), Java® regular expressions are advantageously used to denote snippet search syntax. How the regular expressions for the text snippets are defined may depend upon the data source. For example, the snippet query "Dove"® may be used for news articles in which the capitalization of brands is regularly practiced, but "dove" may be used for blogs where no regular capitalization is employed.

A regular expression (see, for example, the web site given by the concatenation of "http:" and "//en.wikipedia.org/wiki/Regular_expression") is a concise description that defines a set of text strings that match a given pattern. It acts as an algorithm or set of rules that represents domain knowledge about what constitutes an interesting entity or issue as it appears in different text representations. For the methods described herein, the domain expert (e.g., the user) may supply regular expressions for both positive and negative rules. Positive rules say what a text string MUST have in order to qualify as matching. Negative rules (if they are used) EXCLUDE any text strings that match their pattern. If positive and negative regular expressions are used for a name (related to an organization's identity) and a topic of interest, then there is a high probability that any snippet so identified is of interest to the user. Note that a text string that matches both the positive regular expression and the negative regular expression is excluded from the overall matching set. Also, a text string that does not match the negative regular expression will not be included unless it also matches the positive regular expression.

Once snippets have been identified, a dictionary is built for snippet terms occurring in the text, and a feature vector space is built that describes each snippet as a set of dictionary term counts within that space (see, for example, W. S. Spangler et al., "Machines in the conversation: Detecting themes and trends in information communication streams", *IBM Systems Journal*, vol. 45, no. 4, pp. 785-799, 2006). This vector space helps identify "duplicate" snippets and remove them from the analysis results. This "duplicate" removal can be especially important for Web data sets, where typically more than half the data consists of duplicate content. Using text snippets enables a more precise analysis of documents at the level where the interesting content needs to be modeled.

Note that such snippet-based de-duplication does not necessarily have the same effect as any de-duplication used during the ETL processing. During ETL, checksums of the full articles may be computed and used to perform de-duplication. Such a process can remove articles that are exact duplicates of each other, thereby avoiding loading excess data into the data warehouse. The snippet-based de-duplication approach described here, however, is different: It might result in the elimination of "nearly duplicate" articles rather than only exact duplicates. Second, it operates on text snippets rather than full articles. Both types of de-duplication may be advantageous depending on the situation. A checksum-based approach during ETL process can avoid the loading of large amount of duplicates into the warehouse and hence burdening subsequent analysis. Snippet-based analysis is more flexible and is also useful as part of the methods disclosed herein.

3.3 Analytical Models

Analytical models are used to extract and identify brands and issues/topics in the text snippets. In particular, at least two kinds of analytical models, i.e., the organizational identity model and the topic model are employed, supra. Typically, a user identifies the organizational identity model first, such as brand and corporation names. The models are built by utilizing a user's own domain knowledge, such as knowledge around the chocolate industry and brands, and/or by utilizing system knowledge generated via text mining.

3.3.1. Domain-Knowledge Driven Models.

Knowledge that a user has about a specific industry or corporation can be leveraged to generate an analytical model. For example, a user may be familiar with all the major chocolate brands from one or more companies, such as M&M's® and Crunch®, and make use of this information when formulating the organizational identity model. Likewise, a user's knowledge about the major issues and topics commonly associated with chocolate, e.g., "obesity", "legal", "safety", and "vegetarian" can be used to formulate one or more topic models.

For each user-identified brand and topic/issue, a rule-based annotation capability is provided for extracting the brand and topic/issue semantically out of the text snippets. Each organizational identity model is defined by an algorithm or set of rules represented by Java® regular expressions. The rules include a set of include and exclude patterns, and they can be data source-specific. The "include patterns" specify what text patterns should be considered as matches for the model; the "exclude patterns" indicate otherwise and specify topics that are not of interest to the user but which would nevertheless turn up as matches in view of the "include patterns". Taken together, the "include patterns" and the "exclude patterns", when applied to a given document, indicate or negate the occurrence of a specific topic of interest to the user. An example of an organizational identity model related to the Galaxy® brand of chocolate bars is defined by the rule-based annotators of FIG. 4.

In this example, no special rules are needed to identify Galaxy® from the company's customer call center database, since it is a well-defined brand in that database. However, for blogs and Web data, special rules are needed to accurately identify brands. Also, a set of rules can be defined to exclude snippets that contain "galaxy" but are related to astronomy, NASA, or the like. Such text patterns can be derived by utilizing text analysis tools such as Business Insights Workbench, supra, to look for co-occurring text patterns around galaxy. The hot issue/topic models can be derived similarly. FIG. 5 shows a rules-based hot issue model directed to the issue of the "environment".

3.3.2. System Generated Models.

Although a user's domain knowledge may be important to generating effective analytical models, sometimes a user may not be aware of newly emerging topics and issues around brands, such as "vegetarian" as it relates to "chocolate", or "raw meat" as it relates to "pet-food". In such cases, potential hot topics and issues may be generated automatically via statistical analysis using a Chi-Squared test (see, for example, W. Press et. al., "Numerical Recipes in C", 2nd Edition, *New York: Cambridge University Press*, pp. 620-623, 1992).

Such analysis may be performed against the text snippets to identify whether the frequency of word/phrase occurrence within a given time period is significantly greater than expected. Such a model may be designated a "significance based model". For example, words such as "gift" occur far more frequently around Valentine's Day. Similarly, if there were a significant announcement from a corporation regarding the entrance of a product into the markets of China and India, blogs and news may include words such as "announcements", "China", and "India", with greater frequency than usual. Although such techniques are not as precise as domain-knowledge-driven models, they may be effective in catching emerging trends.

3.4 Orthogonal Filtering

Alert systems, such as those used by corporations, typically employ a keyword-based approach to generate a single type of query related to the organization's name and/or brands. The "orthogonal filtering" approach described herein is a much more precise way of finding relevant content. It is based on the premise that any single model by itself (e.g., a single brand model or a single hot-issue model) is likely to be unreliable, whereas multiple and independently generated models used in concert are much more likely to be reliable. For example, by querying all articles that include a reference to "galaxy bars", one would likely identify articles in which "galaxy bars" are mentioned but are not the subject of the article, or articles that mention the bars in a way that is of no particular relevance as far as brand reputation is concerned. Likewise, a query directed to an issue of immediate interest (a "hot issue") is also likely to generate many hits that are of no particular relevance to the user. However, by employing the two models together, the results are potentially much more pertinent, as discussed in the example below. Thus, the term "orthogonal" indicates the relative independence of one model to another, such as brand name vs. topic/issue. By combining these two independent models, e.g., brands and "hot issues", and looking for what lies at the intersection, the size of the resulting article set can be dramatically reduced without loss of precision.

Accordingly, under the orthogonal filtering approach, only those text snippets having both an organization-related name (e.g., brand name, trade name, name of a company, etc.) and an issue of interest undergo further processing. Such a co-occurrence in a text snippet of a given document is much more likely to be indicative of that document's relevance than if that document were identified by just one of the models (e.g., the organizational identity model alone or the topic model alone).

3.5 Alerts

A significant co-occurrence of an organizational name (brand name, trade name, etc.) with a topic/issue over a certain time period triggers an "alert" to the user. In practice, a week appears to be the right time window to ensure timeliness without losing the overall context of the event or issue. What constitutes significance is up to the organization to decide. For some issues and data sources, a single occurrence may be deemed sufficient to generate an alert. For others, an additional metric may be used, such as the frequency of word occurrence within the selected time period. Even when a single co-occurrence of a brand/issue combination is considered of potential interest, the reduction in the volume of text that orthogonal filtering enables is significant, sometimes by a factor of hundreds, as demonstrated by the example presented in the next section.

When an alert is generated, a number of articles or other documents may be identified in an accompanying report. The number of documents that a user has to read may be reduced by appropriate grouping or sorting of these documents. For example, documents identified by the orthogonal filtering approach (e.g., all articles related to both health and chocolate) may be sorted by comparing the distances of the corresponding snippets' feature vectors from the average feature vector (centroid). This approach is designated as "most typical" sorting (W. S. Spangler et al., "Machines in the conversation: Detecting themes and trends in information communication streams", *IBM Systems Journal*, vol. 45, no. 4, pp. 785-799, 2006). It allows a user to read only the first one or two articles for a given combination of organizational identity and topic models, so that the user gets an immediate idea as to whether anything interesting is going on.

4. Case Study and Evaluation

To evaluate the effectiveness of the methodology described herein, various comparisons between it and a conventional keyword-search based approach were made. Specifically, three different types of CGM data sources were evaluated (news using Lexis Nexus®, blogs, and Web crawls) over a 3 month period for a particular consumer goods company. A dozen different chocolate brands associated with this company were used to define respective organizational identity models, and more than twenty different topic models were used, directed to such topics as "infection", "dishonest behavior", "harm", "legal", "contamination", and "environment". The results are shown in FIG. 6.

A broad keyword-based query executed against all of this company's brands returned thousands of articles per week and even more text snippets (see the second column). Note that the text snippet counts should be at least as great as the number of documents in the result set from the keyword-based query, since each article may contain more than one text snippet of interest. Typically, there were a small number of text snippets per article. After de-duplication, the result set was reduced by 62%, 64%, and 80% for the three sources, respectively (see the third column), with the Web containing more duplicates than the other two sources. Even so, thousands of articles are still too many for an individual to read through.

After applying the brand names and the topics through orthogonal filtering, only tens of alerts (see the fourth column) corresponding to a few hundreds of articles (see the fifth column) remained, which were then sorted in the "most typical" order on the alert display page for one week. This represented a factor of 10-200 reduction when compared to the initial query result set. Significantly, a detailed study by experts in the consumer goods company consistently found that while not all of the identified alerts were interesting, most of them were, while virtually no important alerts were missed.

5. Hardware

Figure 7:
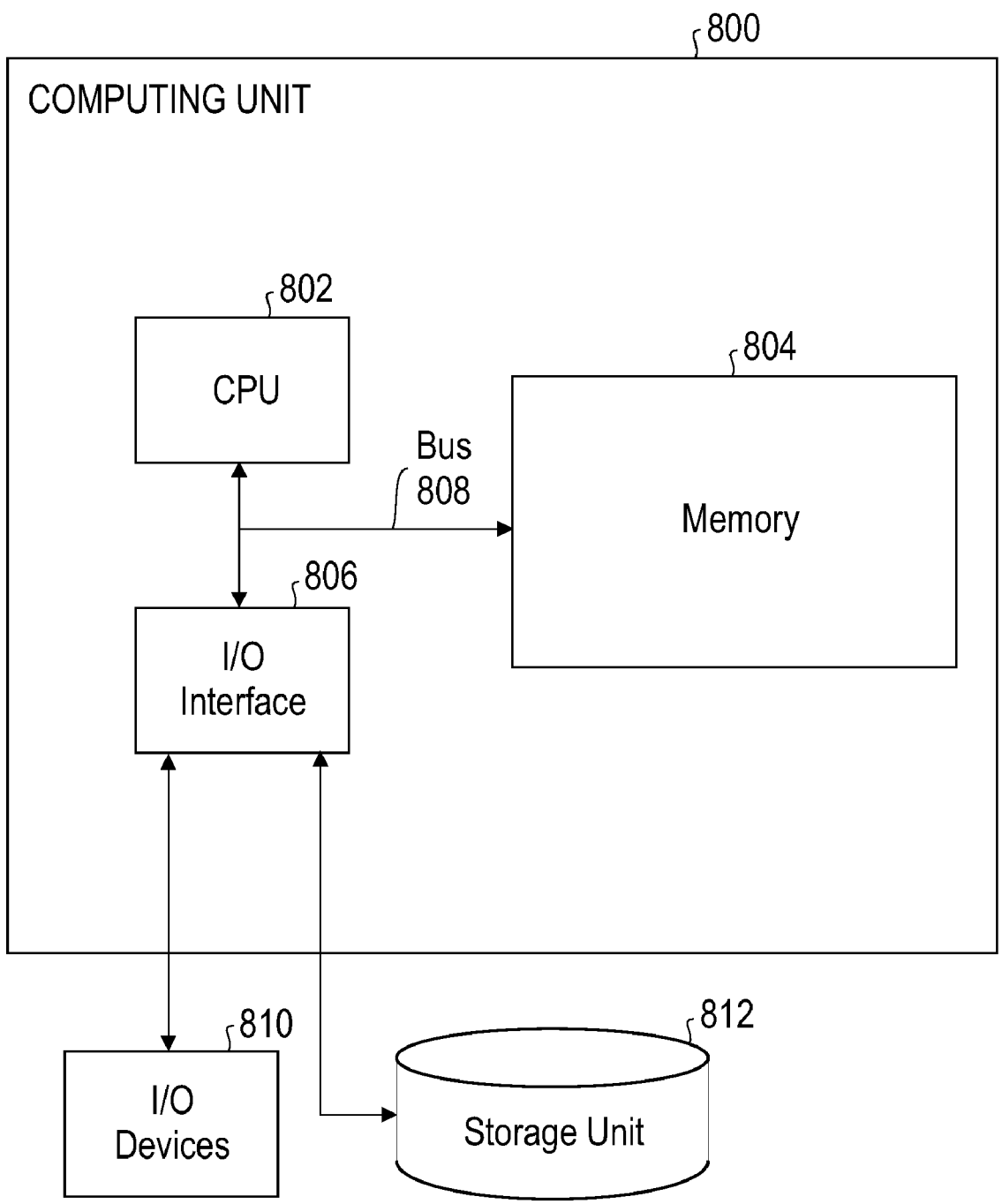
FIG. 7 is a block diagram of a computing unit that may be used in implementing the methods disclosed herein.

FIG. 7 is a block diagram of a computing unit 800 for implementing embodiments of the invention. Computing unit 800 is suitable for storing and/or executing program code directed to implementing the methods disclosed herein, and generally comprises a central processing unit (CPU) 802, a memory 804, an input/output (I/O) interface 806, a bus 808, I/O devices 810 and a storage unit 812. CPU 802 performs computation and control functions of computing unit 800. CPU 802 may comprise a single processing unit, or be distributed across one or more processing units in one or more locations (e.g., on a client and server).

Local memory elements of memory 804 are employed during actual execution of the program code used to implement the methods disclosed herein. Cache memory elements of memory 804 provide temporary storage of at least some program code in order to reduce the number of times code must be retrieved from bulk storage during execution. Further, memory 804 may include other systems not shown in FIG. 5, such as an operating system (e.g., Linux) that runs on CPU 802 and provides control of various components within and/or connected to computing unit 800.

Memory 804 may comprise any known type of data storage and/or transmission media, including bulk storage, magnetic media, optical media, random access memory (RAM), read-only memory (ROM), a data cache, a data object, etc. Storage unit 812 is, for example, a magnetic disk drive or an optical disk drive that stores data. Moreover, like CPU 802, memory 804 may reside at a single physical location, comprising one or more types of data storage, or be distributed across a plurality of physical systems in various forms. Further, memory 804 can include data distributed across, for example, a LAN, WAN or storage area network (SAN) (not shown).

I/O interface 806 comprises any system for exchanging information to or from an external source. I/O devices 810 comprise any known type of external device, including a display monitor, keyboard, mouse, printer, speakers, handheld device, printer, facsimile, etc. Bus 808 provides a communication link between each of the components in computing unit 800, and may comprise any type of transmission link, including electrical, optical, wireless, etc.

I/O interface 806 also allows computing unit 800 to store and retrieve information (e.g., program instructions or data) from an auxiliary storage device (e.g., storage unit 812). The auxiliary storage device may be a non-volatile storage device (e.g., a CD-ROM drive which receives a CD-ROM disk). Computing unit 800 can store and retrieve information from other auxiliary storage devices (not shown), which can include a direct access storage device (DASD) (e.g., hard disk or floppy diskette), a magneto-optical disk drive, a tape drive, or a wireless communication device.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

The invention can take the form of a computer program product accessible from a computer-usable or computer-readable medium providing program code for use by, or in connection with, a computing unit 800 or any instruction execution system to provide and facilitate the capabilities of the present invention. For the purposes of this description, a computer-usable or computer-readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, RAM 804, ROM, a rigid magnetic disk and an optical disk. Current examples of optical disks include compact disk—read-only memory (CD-ROM), compact disk—read/write (CD-R/W) and DVD.

The diagrams depicted herein are provided by way of example. There may be variations to these diagrams or the steps (or operations) described herein without departing from the spirit of the invention. For instance, in certain cases, the steps may be performed in differing order, or steps may be added, deleted or modified. All of these variations are considered a part of the present invention as recited in the appended claims.

The invention may be embodied in other specific forms without departing from its spirit or essential characteristics. The described embodiments are to be considered in all respects only as illustrative and not restrictive. The scope of the invention is therefore indicated by the appended claims rather than by the foregoing description. All changes within the meaning and range of equivalency of the claims are to be embraced within that scope.

What is claimed is:

1. A computer-implemented method, comprising:
receiving at least one keyword-based query from a user device;
applying said at least one keyword-based query to a collection of documents to determine which ones of them are of potential interest, the documents of potential interest thereby forming a subset of the collection of documents;
extracting text snippets from documents in the subset, each of the extracted text snippets including at least one term of interest;
applying, to text snippets extracted from documents in the subset, a name-based text pattern model, and applying, to text snippets extracted from documents in the subset, a topic-based text pattern model that is independent from the name-based text pattern model, thereby identifying text snippets having references to both i) a predetermined entity of interest known by a given name and ii) a predetermined topic of interest; and
identifying documents corresponding to the identified text snippets, wherein:
i) the name-based text pattern model excludes from consideration text snippets in which the given name appears but which in context does not refer to the entity of interest,
ii) the topic-based text pattern model specifies at least one unwanted text pattern that matches a topic other than the predetermined topic of interest, so that text snippets including said at least one unwanted text pattern are excluded from consideration,
iii) each of the models uses at least one regular expression, and
iv) the given name is selected from the group consisting of trade names, brand names, and company names.

2. The method of claim 1, further comprising periodically providing output to an interested party.

3. The method of claim 2, comprising:
applying the name-based text pattern model to extracted text snippets to determine which ones of them have a reference to the predetermined entity of interest, thereby forming a subset of the extracted text snippets; and
applying the topic-based text pattern model to text snippets in the subset of the extracted text snippets, thereby identifying text snippets having references to both i) the predetermined entity of interest and ii) the predetermined topic of interest, wherein each of the text snippets is no longer than 50 words.

4. The method of claim 1, comprising identifying and eliminating any duplicate among the extracted text snippets, thereby forming a set of remaining text snippets.

5. The method of claim 1, further comprising:
reading at least portions of said identified documents; and
identifying potential newsworthy trends in view of said reading.

6. The method of claim 1, wherein the given name is a trade name.

7. The method of claim 1, wherein the given name is a name of a company.

8. The method of claim 1 wherein the given name is a brand name.

9. The method of claim 1 wherein each of the text snippets is no longer than three sentences.

10. The method of claim 1, further comprising sorting the identified documents according to a measure of their relevance.

11. The method of claim 1 wherein the collection of documents includes documents taken from consumer-generated media.

12. At least one tangible computer-useable storage medium, said at least one medium having a computer-readable program, wherein the program upon being processed on a computer causes the computer to implement the steps of:

applying at least one keyword-based query to a collection of documents to determine which ones of them are of potential interest, the documents of potential interest thereby forming a subset of the collection of documents;

extracting text snippets from documents in the subset, each of the extracted text snippets including at least one term of interest;

applying, to text snippets extracted from documents in the subset, a name-based text pattern model, and applying, to text snippets extracted from documents in the subset, a topic-based text pattern model that is independent from the name-based text pattern model, thereby identifying text snippets having references to both i) a predetermined entity of interest known by a given name and ii) a predetermined topic of interest; and identifying documents corresponding to the identified text snippets, wherein:

i) the name-based text pattern model excludes from consideration text snippets in which the given name appears but which in context does not refer to the entity of interest, ii) the topic-based text pattern model specifies at least one unwanted text pattern that matches a topic other than the predetermined topic of interest, so that text snippets including said at least one unwanted text pattern are excluded from consideration, iii) each of the models uses at least one regular expression, and iv) the given name is selected from the group consisting of trade names, brand names, and company names.

* * * * *